United States Patent [19]

Stover

[11] Patent Number: 4,532,625
[45] Date of Patent: Jul. 30, 1985

[54] COMMUNICATIONS NETWORK STATUS INFORMATION SYSTEM

[75] Inventor: Harris A. Stover, Vienna, Va.

[73] Assignee: The United States of America as represented by the Secretary of the Army, Washington, D.C.

[21] Appl. No.: 542,635

[22] Filed: Oct. 17, 1983

[51] Int. Cl.³ .............................................. H04Q 11/04
[52] U.S. Cl. ........................................ 370/58; 370/16; 370/60
[58] Field of Search .................... 370/16, 58, 60, 94; 340/825.02

[56] References Cited

U.S. PATENT DOCUMENTS

| | | | |
|---|---|---|---|
| 4,022,982 | 5/1977 | Hemdal | 179/15 AT |
| 4,048,446 | 9/1977 | Hafner et al. | 370/16 |
| 4,079,209 | 3/1978 | Schwerdtel | 370/60 |
| 4,081,612 | 3/1978 | Hafner | 179/15 BA |
| 4,125,808 | 11/1978 | Graham | 325/55 |
| 4,142,069 | 2/1979 | Stover | 179/15 BS |
| 4,144,414 | 3/1979 | Nicholas | 179/15 BS |
| 4,168,400 | 9/1979 | de Couasnon et al. | 179/15 BA |
| 4,190,821 | 2/1980 | Woodward | 370/16 |
| 4,271,511 | 6/1981 | Manber et al. | 370/16 |
| 4,276,643 | 6/1981 | Laprie et al. | 370/16 |
| 4,287,592 | 9/1981 | Paulish et al. | 370/88 |
| 4,308,613 | 12/1981 | Chasek | 370/94 |
| 4,317,193 | 2/1982 | Joel, Jr. | 370/54 |
| 4,320,500 | 3/1982 | Barberis et al. | 370/94 |
| 4,347,498 | 8/1982 | Lee et al. | 370/60 |
| 4,380,063 | 4/1983 | Janson et al. | 370/60 |
| 4,399,531 | 8/1983 | Grande et al. | 370/94 |
| 4,443,875 | 4/1984 | Blausten | 370/60 |
| 4,475,192 | 10/1984 | Fernow et al. | 370/60 |

Primary Examiner—Douglas W. Olms
Assistant Examiner—Kenneth I. Rokoff
Attorney, Agent, or Firm—John H. Raubitschek; Arthur I. Spechler; Werten F. W. Bellamy

[57] ABSTRACT

This disclosure concerns a communications network information system, and provides apparatus and a method for efficiently providing survivable communications capability to every surviving node in the communications network from every other surviving node. The types of information provided can include high priority message between users of the communications system, or perhaps of even greater importance, very frequently updated status information about the communications network nodes and their interconnecting links for use in optimally utilizing the surviving resources of a heavily damaged network. With this capability every surviving node in the network will be automatically and efficiently provided with the status of every node and interconnecting link.

24 Claims, 4 Drawing Figures

COMMUNICATIONS NETWORK STATUS INFORMATION SYSTEM

FIELD OF THE INVENTION

The present invention relates in general to a communications network system, and in particular relates to a status information system for a communication network in which the status of every communications link in the network is provided to every node that has at least one surviving link connecting it to the network. There is also an efficient highly survivable capability for high priority messages for use when part of the network has been heavily damaged or destroyed.

BACKGROUND OF THE INVENTION

Communications networks for voice communications (telephone), and also other forms of communications, usually consist of a number of nodes (or stations) interconnected by transmission links. This is because it is impractical to provide a transmission link from every user to every other user if the number of users is large. Therefore, the users are connected to a switch (or switches) which is used to provide a connection to any other user when such a connection is needed. If the number of users is very large and they are widely dispersed, it is more practical to provide more than one switch. The multiple switches are interconnected by communications links to form a network. The interconnecting links between switches provide additional economy by permitting a large number of calls or messages to share a common transmission facility (this is called multiplexing).

In a very large communications network, it is usually impractical to provide enough transmission links to directly connect every switching node to every other switching node. Hence, it is common practice for the telephone call, or other form of communications, to be passed from node to node through tandem connections of the transmission links in order to establish a path between the node to which the originating user is connected and the node to which the destination user is connected. Some of the nodes serve as access switching nodes through which users access the network, while others serve only as tandem switching nodes to establish connection through more distant nodes, and still others provide both functions. The switching nodes permit a most efficient utilization of transmission facilities by allowing the interconnecting transmission facilities to be shared among a large number of users. In large networks which have several nodes, the switches permit an alternate path (through different tandem nodes) to be selected when a portion (either a switch or a connecting link) of a particular path between two users is fully loaded. The switches can also permit selection of alternate paths when some of the nodes or transmission facilities are inoperative due to equipment failures, natural disasters, or acts of war.

A communications network to support recovery from natural disasters or to support wartime military operations must have the capability to provide survival of the communications even when major portions of the network have been destroyed. One of the best methods of enhancing such wartime communications survivability is to provide and make use of a large number of nodes, each with connecting links to many other nodes. This will provide a large number of paths through different combinations of interconnecting transmission facilities. This results in a good possibility that useful paths between two users will survive when several nodes and transmission links are inoperative.

To make use of the requisite redundancy to enhance communications survivability, some method of controlling the facilities and selecting alternate (surviving) paths through the network is needed. To best use alternate paths to assure communications between any two users, it is desirable to provide for automatic selection of routing through surviving nodes and interconnecting transmission links in the damaged network. In order to maximize system survivability, the automatic routing system itself must be distributed, i.e., it must have no points of centralized vulnerability. Therefore, a capability is needed for each node to make local routing decisions for calls and messages originated by a user directly connected to the node or for calls and messages for which it is an intermediate connecting node (a tandem switching node). In order to accomplish distributed system control and call routing or message routing through the network in a straight-forward, effective manner with minimum delay, it is highly desirable to have nearly real-time network status information available at all nodes throughout the network. Such network status information tells which links are operational and which are not.

It is impractical to use individual messages to pass network status information from every node to every other node. Such a system would require the utilization of an unacceptably large portion of the network's communications capacity. Just transmitting the information needed to label the data to indicate to which individual transmission links each status indicator applies requires a large amount of transmission capacity.

In addition to a need to provide network status information throughout the network for use in call or message routing and system control, there is a need to provide a survivable message service for extremely important messages. This service is needed for priority messages of such importance that they sould be delivered to every node of the network over every existing (surviving) path.

Among the prior art are a number of patents which disclose inventions relating to the field of communications networks. For example, the Chasek U.S. Pat. No. 4,308,613 discloses a simplex data transmission system that includes a means for using alternate routing in case there is a failure in one of the communications links. The system incorporates end-of-message codes and no-message signals into the data transmission and detects the absence of any signal in the primary link. The Hemdal U.S. Pat. No. 4,022,982 discloses apparatus for rearranging a switching network to overcome an overload condition. The apparatus includes a memory unit for recording the actual network condition in a number of memory cells, each cell having a record of which network input and network output is interconnected via the link in question. The Stover U.S. Pat. No. 4,142,069 discloses a system that distributes a time reference to a plurality of interconnected nodes of a communications network for synchronizing the network and correcting each local node's time error. Information is passed between nodes to indicate the path the signal has taken and a weighing function is assigned to reflect the path taken. The Joel U.S. Pat. No. 4,317,193 discloses a switching network having a plurality of nodes through which various links can be established to interconnect the nodes utilizing the least busy path. A scanner and a scan counter memory is used to map the nodal use. The Paulish et al. U.S. Pat. No. 4,287,592 discloses a communications system between a plurality of loops of ring connected sets of nodes in which alternate routing can be accomplished. Primary and secondary functional addresses of the receiving station of a particular node are injected into an information packet and are utilized to locate the correct receiving station. The Graham U.S. Pat. No. 4,125,808 discloses a communications system comprised of a network of retransmission units, each of which is connected to a plurality of transmitting and base units. The system utilizes frequency-time co-channel addressing techniques and pulse-position modulation to select available communications links, and the various components of the system store identifying information sent by each entrant and store call status information in a network memory unit. The de Conasnor et al. U.S. Pat. No. 4,168,400 discloses a digital communication system having a plurality of interconnected stations, each station producing information, including addressing information, that is transmitted in packets. Each station can retransmit a message received from another station in a predefined priority order. The Nichols U.S. Pat. No. 4,144,414 discloses a multinode communications system having a frequency synchronization circuit and a mechanism for detecting transmission errors. The Hafner U.S. Pat. No. 4,081,612 discloses a digital telecommunications network having means for building up a routing address when only the call number is known and the location and network are unknown.

SUMMARY OF THE INVENTION

The present invention is intended to automatically and survivably provide a predefined message to every node in a communications network information system. In one embodiment, the predefined message contains the operational status of every other node and of every interconnecting link in the network. In another embodiment, the predefined message contains a priority communication. The present invention accomplishes this by efficiently using redundant paths to automatically provide the information over every path existing in the network.

A first purpose of the invention is to use status information to ensure that routing can be effectively provided to surviving facilities in a heavily damaged network, and to ensure that the network is capable of routing user communications between any two user locations so long as any path exists between them.

A second purpose of the invention is to ensure that short messages essential to modern warfare can be quickly and reliably delivered by economically, on a priority basis, transmitting such messages from any node in the network to all other nodes in the network over every existing path in the network. This is accomplished efficiently in a way which uses only a very small portion of the capacity of a network, such as a digital voice communications network.

The invention can also be used for any type of digital communications for which it is important to assure delivery by simultaneous transmission over all paths in the network.

It is a purpose of the present invention to provide a system for the automatic collection and distribution of communications network status information about which nodes and interconnecting communications links of the network are operational and conversely about which ones are inoperational. Such collection and distribution of communication network status information is provided throughout the entire network so that it can be available to all nodes that can make effective use of it. The present invention also rapidly collects and distributes the network status information so that the network status information available at every node throughout the network is updated periodically. The present invention further provides a high degree of redundancy in the collection and distribution of such network status information. This redundancy is such that even when major stations of the network are damaged or destroyed, network status information about the surviving nodes and the links connected to those surviving nodes is available at all surviving operational nodes remaining in the network. (Information is also available to all nodes in an interconnected portion of a fragmented network for all links and nodes of that portion.)

It is a purpose of this invention to provide simultaneously all of the above capability in an economical way using no more than a small portion of the communications capacity normally provided by such communication facilities. It is a further purpose of this invention to provide the capability for a surviable communications service whereby every node in the network can independently originate a message at the same time that all other nodes are originating different messages, and that all of these messages will be delivered to every node in the network over every existing (surviving) path.

It is a further purpose of this invention to provide the capability for a survivable communications service whereby certain designated nodes of the network can originate much larger messages by using the communications capacity which other nodes could have used to simultaneously originate independent messages. This permits such larger messages to be delivered to every node in the network over every existing (surviving) path.

It is another purpose of this invention to provide a survivable communications service whereby every node in the network is permitted to bid on a priority basis for the use of survivable communications capacity to originate relatively long survivable messages which will be delivered to every node in the network over every then existing (i.e., surviving) path. It is a further purpose of this invention to distribute every bid for the use of the network's capacity for survivable communications to every node in the network over every existing (surviving) path, and to provide capabilities whereby each node in the network can locally determine which node (or nodes) is the successful bidder, thereby assuring that the survivable message capacity will temporarily be reserved for the successful bidder. The capability can also be provided whereby every successful bidder for use of the network survivable communications capability can have the capability to originate a relatively large message for delivery to every node of the network using every existing (surviving) path. It is yet another purpose of this invention to provide a capability for users of the network to have access to the survivable communications capability of the network.

In the disclosed embodiments of the invention:

(a) network status data is provided to all nodes throughout the network in a most survivable way in order to make the status of all internodal transmission links known at every operational node in the network—information which can be used for call or message routing and network control;

(b) there is a capability for every node in the network to bid for the use of a survivable message communications capability so as to permit the successful bidder to originate a relatively large message which can be delivered to every node in the network over every surviving path;

(c) there is a capability for every node in the network to locally determine the successful bidder and temporarily reserve the survivable message capacity for that successful bidder;

(d) there is a capability for every successful bidder to originate a message which the survivable message system will deliver to every node in the network over every existing (surviving) path; and (e) there is a capability for users of the network to access the survivable message capability for receiving survivable messages, to originate survivable messages, or both.

It is a further purpose of this invention to provide all of the above capability for both communications system status monitoring and a survivable message service in a most effective and efficient way making use of every existing (surviving) communications path.

One feature of the invention is that it provides means for automatically collecting network status information and distributing it throughout the network. Another feature of this invention provides for the frequent and automatic updating of network status information. A further feature of this invention provides for the survivability of the network status information by distributing it over every path in the network.

Other features of this invention are that it accomplishes the distribution of network status information without using more than a small fraction of the normal transmission capacity of the network and that it provides the operational status information from every node of the network to every other node of the network so that the operational status of every node and every interconnecting transmission link is available at all nodes in the network.

A further feature of the invention provides for the efficient use of the network's transmission capacity by permitting the above network status information to be communicated from every node to every other node without requiring each node to send an individual message to every other node of the network in order to do it. Another feature of the invention permits every node in the network to provide a portion of a single message which is delivered to all nodes in the network, whereby network capacity is efficiently used to provide network status information correctly without a need to transmit address information. Another feature of the invention provides for efficient use of network capacity by providing such information without requiring the transmission of the source of the information and without requiring transmission of the identity of the link to which it applies. This identity information is provided a priori through time slot assignment and provision of effective means of getting the correct information from widely separated parts of the network into the correct time slots of the same message. Yet another feature of the invention allows simultaneous origination of a short message by two or more nodes in the network, all of which will be delivered to every node in the network over every existing path using only a very small portion of the normal transmission capacity of a network, such as a digital voice network. Another feature of the invention provides means for every node in the network to bid on a priority basis for the use of survivable communications capacity to originate relatively long survivable messages which will be delivered to every node in the network over every existing path, using only a very small portion of the normal capacity of a digital voice network.

Other features of the invention permit every node in the network to locally determine which node is the successful bidder thereby assuring that the survivable message capacity will temporarily be reserved for the successful bidder, permit each successful bidder for the survivable communications function to originate a relatively large message of variable length for delivery to every node in the network using every existing path, and permit users of the network to have access to the survivable communications capability described in the other features.

Still other features of the present invention will be described in or become apparent from the descriptions of the presently preferred embodiments of the invention set forth hereinbelow.

DETAILED DESCRIPTION OF THE PREFERRED EMBODIMENT

Figure 1:
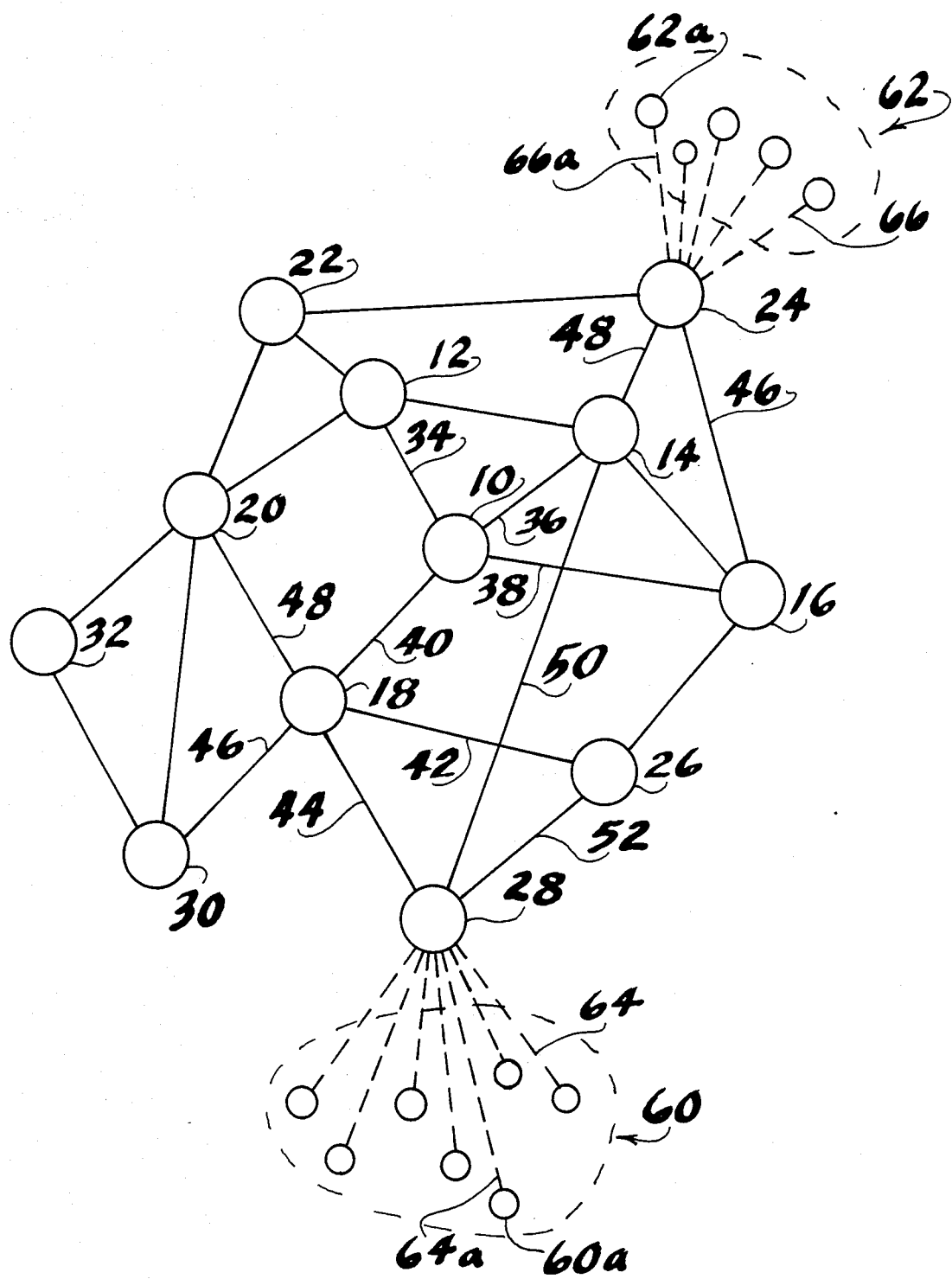
FIG. 1 is a schematic block diagram illustrating a twelve node communications network of the type to which the invention might be applied.

With reference now to the figures, wherein like numerals denote like elements throughout the several figures, a communication network status information and priority system is depicted. In FIG. 1 a typical communications network is shown. The network includes twelve nodes in the present example, numbered 10, 12, 14, 16, 18, 20, 22, 24, 26, 28, 30 and 32. Each node is connected to at least two other nodes by a conventional message transmission link. For example, node 10 is connected to nodes 12, 14, 16 and 18 by links 34, 36, 38 and 40, respectively; node 18 is connected to nodes 26, 28, 30 and 20 by links 42, 44, 46 and 48, respectively, as well as to node 10 by link 40; and node 28 is connected to nodes 14 and 26 by links 50 and 52, respectively, and to node 18 by link 44.

Each node may also be connected to a large number of users, such as those users indicated at 60 and 62 connected to nodes 28 and 24, respectively by corresponding individualized local links 64 and 66, (shown by dashed lines). However, some nodes may be strictly tandem communications nodes that do not provide direct user access. If any particular user, such as user 60a, desires to communicate with any other particular user in the network, such as user 62a, then the communications linkages will usually include routing through at least two nodes, excepting of couse for communications by users connected to the same node. Normally communications between user 60a and user 62a would go through local link 64a of local user 60a to node 28, through link 50 to node 14, through link 48 to node 24, and finally through a local link 66a to user 62a. However, should node 14 or links 50 or 48 be overloaded or destroyed, the communications is still possible by any other available path, such as through link 44 to node 18, through link 40 to node 10, through link 38 to node 16 and finally through link 46 to node 24.

For exemplary purposes only for describing the presently disclosed embodiment of the invention, a disabled node is considered to be operationally equivalent to all interconnecting communications links to that node being disabled, and vice versa. Thus, it is unnecessary to keep track of the operational status of both nodes and interconnecting transmission links in order to know the status of the network. Therefore, an inoperative node is indicated by the equivalent representation of all of its links being inoperative.

The electronic equipment, except for minor difference to permit a different number of local links, can be substantially the same at each node. Except as noted below, the circuitry of the electronic equipment is commercially available or could be devised by one of ordinary skill in the art.

According to the present invention, the network status equipment at each node is synchronized to operate on a cyclic basis. For purposes of description, the basic cycle has a period of two minutes and is comprised of subcycles, each having a period of one second. Obviously, as would be appreciated by those skilled in the art, other cycle periods and subcycle periods could be used that would be more advantageous for a particular application.

Figure 2:
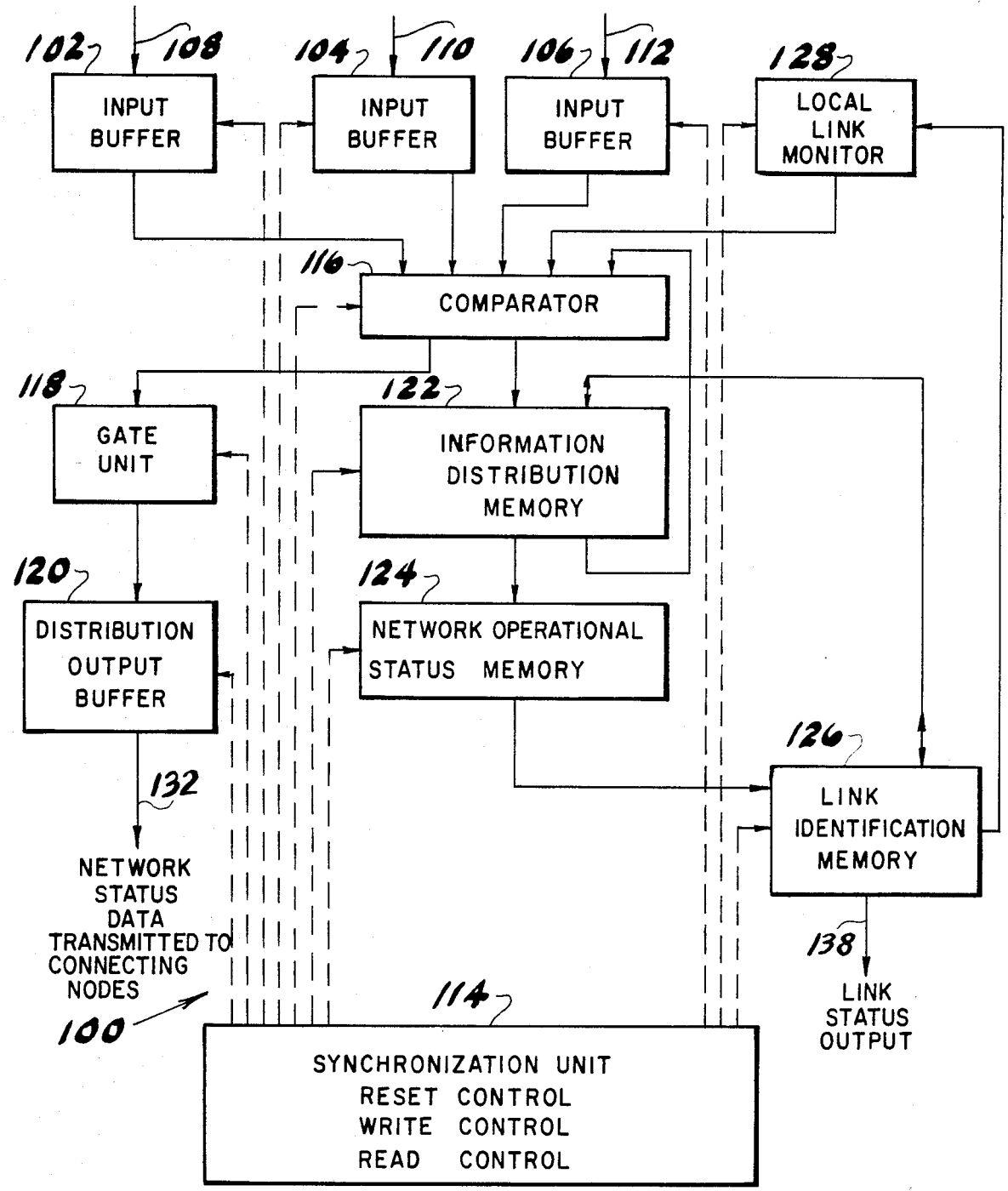
FIG. 2 is a functional schematic block diagram of a first embodiment of the present invention in which network status equipment is depicted at a typical node of the network, such as any of the nodes of FIG. 1.

Referring now to FIG. 2, a communication network status information system 100 according to one embodiment of the present invention is depicted in schematic block diagram form. System 100 is installed at each node in the network depicted in FIG. 1. For the sake of convention with respect to the description of FIGS. 2, 3 and 4, solid lines connecting blocks indicate the flow of information signals and dashed lines connecting blocks indicate the flow of control signals. Arrows on the lines indicate the direction of flow.

System 100 is comprised of a plurality of input buffers such as buffers 102, 104 and 106 depicted in FIG. 2. The number of input buffers in each system 100 equals the number of links going into the node. Only three input buffers have been depicted in FIG. 2, but as would be obvious to one skilled in the art, a node such as node 18 (FIG. 1) would require five input buffers. Each input buffer 102, 104 and 106 is connected to a corresponding input line 108, 110 and 112, respectively, by which the input buffer receives status information from a neighboring node. Input buffers 102, 104 and 106 are variable delay storage buffers which permit timing correction for variations in the signal transit time of various lengths of transmission links from neighboring nodes. Information is read into these buffers when received. This information is read out of buffers 102, 104 and 106 when needed under the control of a synchronization unit 114.

Synchronization unit 114 is synchronized with a corresponding synchronization unit at every other node. There are several methods, such as that depicted in U.S. Pat. No. 4,145,069, incorporated herein by reference, for synchronizing each of the synchronization units. Synchronization unit 114 is the central control unit for resetting memories, writing into memories, reading information out of memories, retiming of information in data storage buffers, and controlling the transfer of most information from one place to another place in communication network status information system 100.

As mentioned above, the present description has assumed a subcycle period of one second. Thus, input buffers 102, 104 and 106 must be provided with a sufficient storage capacity so that under control of synchronization unit 114, data read out of an input buffer at any given time (i.e., in any particular time slot) corresponds to the equivalent time slot read out of the corresponding buffer at a neighboring node, but exactly one subcycle period (i.e., one second in the present example) earlier. In other words, it corresponds to the equivalent or corresponding time slot in the previous adjacent one second subcycle period. Since preferably input buffers 102, 104 and 106 are variable delay buffers whose outputs are under control of synchronization unit 114, as mentioned above, and the time slots have been identified by a synchronization code of the multiplexed bit stream, this is a quite normal function.

The outputs from input buffers 102, 104 and 106 are connected to the inputs of a multi-input comparator 116. Comparator 116 compares all of its inputs and provides a selected output based on those inputs. For the purposes of explanation, a convention is established for the present invention in which a "0" represents an inoperative link and a "1" represents an operative link. Thus, comparator 116 is used to determine whether any of its inputs is a "1", and if so to provide at its output under control from synchronization unit 114 a "1" at a desired time slot.

Comparator 116 has two outputs. One output is provided to a gate unit 118 which, under control of synchronization unit 114, transmits that output to a distribution output buffer 120 during every time slot of every one second subcycle of the two-minute cycle except the last, and provides a "0" to output buffer 120 during each time slot of the last one second subcycle of each two-minute cycle. This will provide all zeros at all input buffers at neighboring nodes during the first one second subcycle of each two-minute cycle. The other output from comparator 116 is provided to one input of a two input, information distribution memory 122.

Information distribution memory 122 is comprised of resettable electronic memory storage components for receiving, storing, and providing single bit information. Information distribution memory 122 is used for the dual function of accumulating network status information and distributing that information throughout the network. In distribution memory 122, a single bit is used to represent the operational or inoperational status of each link in the network. The identification of a particular link represented by a particular bit is determined by the position of that bit in the memory. Information distribution memory 122 also receives an input from a link identification memory 126, or provides an output to link identification memory 126, both under the control of synchronization unit 114. The principal outputs from information distribution memory 122, however, are connected to comparator 116 to provide one of the inputs to comparator 116, and to a network operational status memory 124.

Distribution output buffer 120, which is similar to input buffers 102, 104 and 106, provides a plurality of identical outputs equal to the number of links to adjacent system nodes. In the particular example of FIG. 2, distribution output buffer 120 provides only three outputs. Thus, the number of outputs from distribution output buffer 120 is equal to the number of input buffers. However, the output from distribution output buffer 120 must be multiplexed with communication and other data into a much larger data stream on each interconnecting link for transmission to neighboring nodes. This multiplexing of many channels of communications on a transmission link between nodes is a normal function in communications systems and is not shown here. It is assumed that such multiplexing at transmitters and demultiplexing at receivers is provided to transmit the output from output buffer 120 to adjacent nodes where the output of the demultiplexer is applied to one of the input buffers. This permits sharing of the communications transmission facilities used for normal communications traffic for providing the much smaller amount of communications used for status information. Synchronization unit 114 controls the timing of outputs from output buffer 120.

Network status memory 124 is comprised of conventional electronic components which store network status information accumulated by distribution memory 122. The network status information is made available for use at the local node. Similar to distribution memory 122, status memory 124 normally uses a single bit to represent the operational or inoperational status of each link in the network, and the particular link represented by a particular bit is identified or determined by the position of the bit in status memory 124. The operation of status memory 124 is controlled by synchronization unit 114, and the output from status memory 124 is connected to one of the two inputs to link identification memory 126.

Link identification memory 126 is comprised of conventional memory electronic components and stores information relative to the relationship between the common link identity of each link in the network and the particular bit storage location in distribution memory 122 or status memory 124. Link identification memory 126 is utilized for changing the format of information stored in network status memory 124 so as to provide an output 138 in the desired format for operational use at a local node. A second output from link identification memory 126 is connected to the input of a local link monitor 128.

Local link monitor 128 is comprised of conventional electronic circuits, including memory circuits, and maintains the status of the local links connected to the particular node. The output of local link monitor 128 is connected to comparator 116. Working in conjunction with link identification memory 126, local link monitor 128 provides a "0" to comparator 116 when either a particular time slot does not correspond to a local node or if the particular link connecting the local node is inoperative. On the other hand, if the particular bit time slot does correspond to one of the local links and that link is operational, local link monitor 128 provides a "1" to comparator 116. Synchronization unit 114 also controls the operation of local link monitor 128 as it does for all other components in communication network status information system 100.

The interrelationship and operation of each of the particular components of communication network status information system 100 can be better understood through a description of the operation of the system. Initially, however, it has been assumed that the multiplexed data stream which contains the network status data is generated by conventional equipment that uses the same synchronized clock which has been synchronized with the clocks at other nodes and which is also used by synchronization unit 114. It is further assumed that the larger multiplexed data stream which contains the normal communications traffic in addition to the network status information of this invention also contains all of the frame synchronization codes necessary to assure that all time slots are properly synchronized at both transmitters and receivers. Should these assumptions be incorrect, then each node will have to have the necessary conventional equipment to provide these functions. Such additional equipment could insert the needed frame code for selection of the time slots in the output data stream from output distribution buffer 120 or at the output of a subsequent multiplexer to which the signal from output buffer 120 is provided for multiplexing with other signals not a part of this subsystem. It is also necessary to have additional conventional equipment for using the frame codes to identify time slots in the data stream received on input lines 108, 110 and 112. It is generally preferable for the time slot selection to be provided by the larger multiplexed data stream so that it would be unnecessary to provide the selection separately for the individual data streams that comprise the multiplexed data stream. For the purposes of the description of the present invention, as stated above, it has been assumed that time slot selection has been provided in the conventional manner in the multiplexed bit stream.

In the operation of network status information system 100, at the beginning of each two-minute cycle, and before processing received information for that cycle, all network status information stored in information distribution memory 122 is transferred under the control of synchronization unit 114 to network operational status memory 124. Immediately following this transfer, information distribution memory 122 is reset by synchronization unit 114 with the result that all stored bits are zeros. Following the resetting of distribution memory 122, network status memory 124 contains bits representing the status of each link in the network as it existed at some time during the previous two-minute cycle. Distribution memory 122 on the other hand, contains bit indicating that no link in the network is operational. The only method for entering a "0" into information distribution memory 122 is for that memory to be reset to all zeros and for a zero to be supplied by comparator 116.

During each one second subcycle, all stored data is sequentially read out of information distribution memory 122 under the control of synchronization unit 114. As each bit is read out of information distribution memory 122—each bit representing one time slot—a sequence of operations occurs.

1. The bit for that storage location or time slot in information distribution memory 122 is read into comparator 116.

2. Link identification memory 126 determines whether that particular bit time slot corresponds to one of the local links connecting a neighboring node to the local node. If that particular bit position does not correspond to a local link, a zero is produced by local link monitor 128 and is sent to comparator 116. If the bit position does correspond to one of the local links and that local link is inoperative, as determined by local link monitor 128, a zero is also produced and provided to comparator 116. On the other hand, if it does correspond to a local link and if the local link is operational as determined by local link monitor 128, a one is provided by local link monitor 128 to comparator 116.

3. The bits stored in input buffers 102, 104 and 106, which correspond to the equivalent time slot in the previous one second subcycle as received from neighboring nodes, are read into comparator 116.

4. Comparator 116 compares all of the inputs and if any input contains a one, a one is read into the same bit location of information distribution memory 122. Thus, this bit will replace the bit that was read from information distribution memory 122, as mentioned above in subparagraph 1. On the other hand, if all of the inputs to comparator 116 are zeros, then a zero is provided by comparator 116 to the same bit location of information distribution memory 122.

5. Comparator 116 also provides the same data, either a zero or a one, to distribution output buffer 120 via gate unit 118. Gate unit 118 has been set by synchronization unit 114 to pass the data through except on the last subcycle of each cycle when it substitutes all zeros.

6. The synchronization unit 114 causes the same sequence of operations to be repeated for the next bit location of information distribution memory 122.

As mentioned above, during the first one second subcycle of each two-minute cycle, all inputs from input buffers 102, 104 and 106 from neighboring nodes are zeros. This is because only zeros were output by gate unit 118 at neighboring nodes during the last one second subcycle of the previous cycle. Because information distribution memory 116 was reset to all zeros also at the beginning of the two-minute cycle, it also provides a zero to comparator 116 along with the zeros from the input buffers 102, 104 and 106. Therefore, the only ones that can be provided to comparator 116 during the first one second subcycle of each two-minute cycle are for those time slots corresponding to the local links that are operational. Hence, at the end of the first subcycle, information distribution memory 122 will contain ones in bit positions corresponding to operational local links and will contain zeros in bit positions corresponding to all other links, including those corresponding to inoperational local links.

This same information is made available to all neighboring nodes during the second one second subcycle of each two-minute cycle. Therefore, at the end of the second subcycle, information distribution memory 122 contains a one in each bit position corresponding to each operational local link and each operational link terminating on any immediate neighboring node, and contains zeros in all other bit positions including those corresponding to inoperational local links and those inoperational links of the immediate neighboring nodes. Similarly, at the end of the third subcycle of the two-minute cycle, information distribution memory 122 contains ones and zeros in corresponding bit positions for operational and inoperational local links for each node that is two nodes away in addition to those that are closer. It can, therefore, be seen that for each successive one second subcycle of each two-minute cycle, the information from nodes that are operational progresses one node further from the node in which the information is originated. At the end of the two-minute cycle, the information will have progressed through 119 tandem links, and will be available for all links that are not farther away than this. Because most operational networks have less than 119 tandem links, at the end of every two-minute cycle, each node will have received the status information for the entire network. This information is stored in network operational status memory 124 until the completion of the next two-minute cycle when it is updated. Obviously, if there are more than 119 tandem links from any node, either the cycle period can be lengthened, or the subcycle period can be shortened such that there are more subcycles per cycle. Conversely, the cycle period can be shortened or the subcycle period lengthened if there are fewer tandem links.

As described above, the present invention provides for passing the information through the entire network over every existing path so long as the path length is not greater than 119 tandem links between the originating node and the destination node. As long as any surviving path not exceeding 119 tandem links (at least in the above description of the invention where there are a total of 119 usable subcycles), continues to exist between two nodes, both nodes will have information of the surviving links that exist between them.

To further illustrate the transmission capacity of the present invention, assume further that the communication network has 500 nodes and that an average of 8 interconnecting transmission links terminate on each node. Then, since each link has two ends, there will be $8 \times 500$ divided by 2 links or 2,000 links interconnecting the nodes of the network. One bit is used to designate the status of each link. Since this information is transmitted once each second, it requires 2,000 bits per second of transmission capacity to transmit the entire status information of the network. This bit rate is only a small portion of a standard 64,000 bit per second voice communication channel. If an entire voice communication channel having 64,000 bits per second were designated for node informational purposes, it can be seen that the status of a 16,000 node network having an average of 8 links per node can be provided every two-minutes using a rate of one subcycle per second.

In any communication system, occasional transmission errors can be expected. Under the assumptions made above in describing the embodiment of FIG. 2, the erroneous reception of a zero instead of a one will cause no change in the state of information distribution memory 122. If information distribution memory 122 had previously correctly received a one for any particular time slot, any subsequent transmission error related to that time slot will not cause an error in the status indication for that particular two-minute cycle. Only if information distribution register 122 had not previously received a one for that time slot or bit position in the sme two-minute cycle will a transmission error result in a readout error. On the other hand, if a zero is erroneously received instead of a one for any particular time slot or bit position that had not previously received a one, the transmission error could cause a delay of one subcycle in the transmission of the correct information. This can happen only if a one (the correct status information) did not appear in the information received from another neighboring node. The obvious net result of such a one cycle delay would be to shorten the maximum number of tandem links from 119 to 118 because the correct digit (i.e., a one) would most likely be received from some neighboring node on the next subcycle.

The only transmission error likely to cause an error in the output of operational status memory 124 is for a zero to be erroneously received as a one, and then only if a correct one is not received for that time slot in either a previous or a subsequent subcycle of the same two-minute cycle. This error will indicate that a particular link is operational when, in fact, it is not. However, it is most probable that any such errors will be corrected during the subsequent two-minute cycle. Further, error correcting codes can be used to reduce the probability of these errors. However, this will also require some additional channel capacity or channel overhead in order to carry the additional bits.

Previously the assumption was made that a "1" represented an operational link and a "0" represented an inoperable link. Obviously, the reverse protocol could be used.

Figure 3:
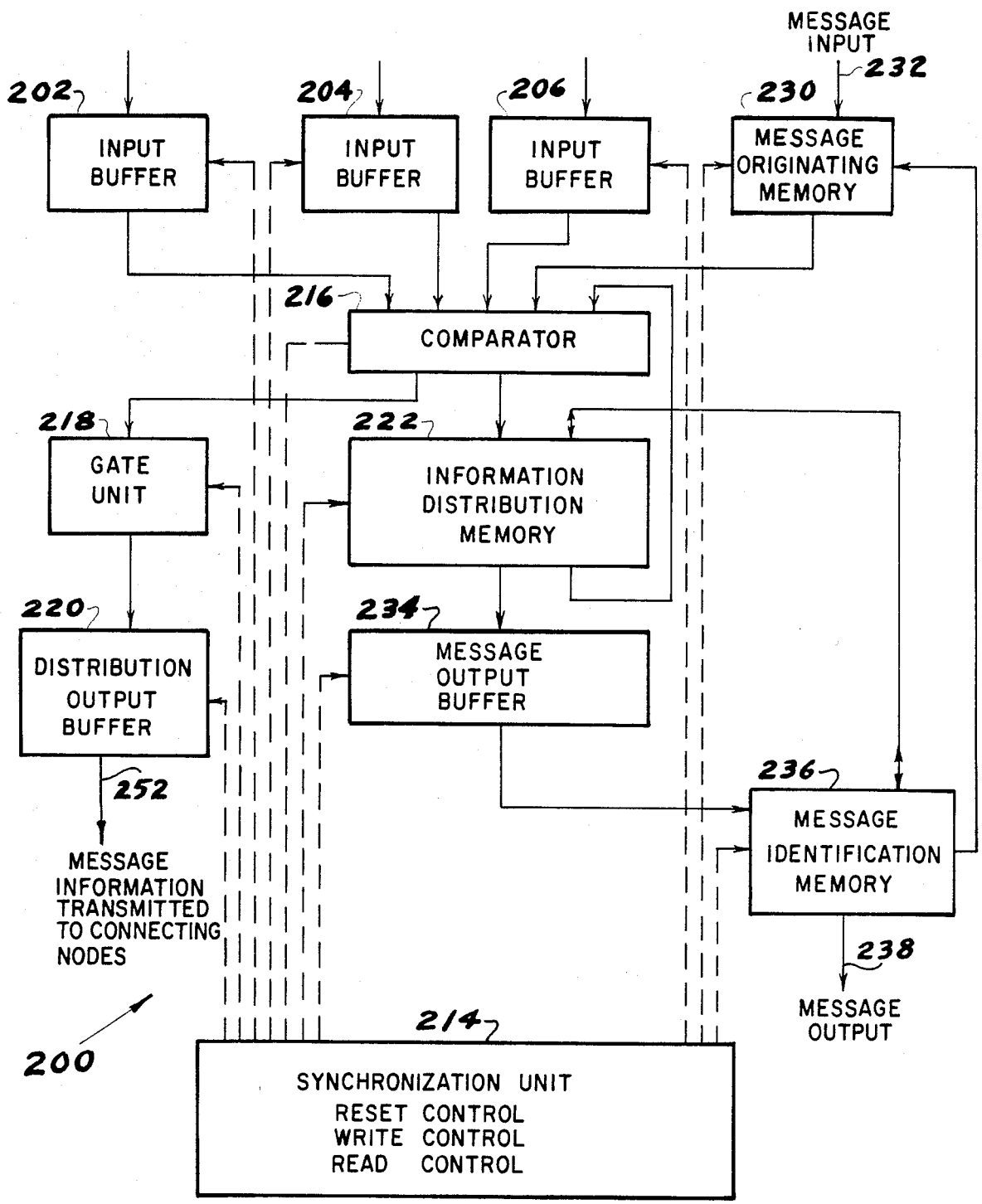
FIG. 3 is a functional schematic block diagram of another embodiment of the present invention.

By assigning another portion of the total multiplexed transmission capacity, a modified version as depicted in FIG. 3 can be implemented in which all of the nodes of the network can simultaneously originate priority messages instead of network status information. These independent messages which originate at each node in the network are delivered to every other node in the network over every existing or surviving path much in the way that the status information proceeded, as described above. In FIG. 3, those functional blocks performing the same operation as performed with the embodiment of the invention in FIG. 2 are given the same last two digits of the designating numeral used in FIG. 2, but are in the 200 series of numbers.

In FIG. 3, a message originating memory 230 replaces local link monitor 128. Message originating memory 230 has an input line 232 connected thereto for receiving a priority message. During the sequence of events following the readout of each bit position (which corresponds to a time slot) from information distribution memory 222 into comparator 216 (in the same way as discussed above with respect to FIG. 2), synchronization unit 214 controls the insertion of individual bits from message originating memory 230 into comparator 216 during those time slots assigned for messages originating at this local node. Other time slots are assigned to messages originating at other nodes.

At the end of the first one second subcycle only the local message appears in information distribution memory 222 while at the end of the second subcycle messages from immediate neighbors also appear and at the end of the third sybcycle messages from nodes one link further away also appear, etc. This process is analogous to the insertion of status data of the interconnecting links which is performed by apparatus 100 depicted in FIG. 2.

Message identification memory 236 has two outputs. The first is connected through message output lines 238 to provide received messages to the local users of the survivable message service. The second is a control line to message originating memory 230 to provide the proper formating of the originated messages being read out of message originating memory 230. For fixed constant formats, this control line might be omitted and all control of the message originating memory provided by synchronization unit 214.

At the end of the two-minute cycle, the message bits from message originating memory 230, along with those from every other node in the network, appear in information distribution memory 222. Because each node has a similar communications message distribution system 200, the same message bits will appear at a corresponding information distribution memory 222 at each node. Information distribution memory 222 is a conventional memory having a sufficient size to accommodate simultaneous messages originating at all nodes in the network.

At the beginning of the next two-minute cycle, the message bits are transferred from information distribution memory 222 under the control of synchronization unit 214 to a message output buffer 234 that is similar in function and operation to network operational status memory 124 depicted in FIG. 2. The contents of information distribution memory 222 and message output buffer 234 are identified by message identification memory 236. Message identification memory 236 also provides the output messages from all other nodes in the network in the desired format and sequence. This includes the addition from an internal memory contained therein of information identifying the originating node for each message. This makes it unnecessary to utilize transmission capacity to identify the originating node for each message.

Other than the foregoing changes, which are relatively minor in nature, the operation of the communication message distribution system 200 of FIG. 3 is essentially the same as the operation of communication network status information system 100 depicted in FIG. 2. The result is an independent message which is originated by each node in the network and includes the identity of the originating node. The independent message is redelivered every two minutes to each operating node in the network using every existing path, or a new message can be provided at minimum intervals of two minutes.

If such a network is assumed to have 500 nodes, and 50,000 bits of internoded transmission capacity (which is less than a single 64,000 bit standard voice channel), then every two minutes every node in the network can originate a new 100 bit message that can be delivered to every other node in the network.

In some cases, a 100 bit message is inadequate. Larger messages can be accommodated if only selected nodes of the network are permitted to originate messages. The system depicted in FIG. 3 can still be used, except that the assignment of memory position or time slots by message identification memory 236 is made only for messages from those nodes permitted to originate the messages. In those nodes not permitted to originate messages, message originating memory 230 remains inactive. For example, if only 10 nodes of a 500 node network are permitted to originate message, and the internodal transmission capacity is 50,000 bits, then simultaneous 5,000 bit messages can be originated from each of the selected 10 nodes. These 10 messages are transmitted over every existing path to every existing node.

Both of the above sets of capabilities, though far superior to conventional, alternative methods of providing survivable communications, still have some difficulties which can be overcome. One of these difficulties was discussed above regarding the size of the survivable message. To increase the message length requires a reduction in the number of nodes of the network that are permitted to originate messages, an increase in the channel capacity used for these messages, or an increase in the length of the cycle used for such transmission. The disadvantages can be overcome by providing a capability for all nodes in the network to bid for the use of the survivable communications capacity. A system of bidding can be provided by the message distribution system 200 depicted in FIG. 3 by modifying some of the functions performed by the depicted equipment.

An example of an operating bidding system can be explained with respect to a specific system. For example, if the network has 500 nodes and 50,000 bits per second of internodal communications capacity, every node in the network can originate a 100 bit survivable message that is delivered to every other surviving node in the network during a two-minute cycle of one second subcycles. These 100 bit messages can be used for each node to submit its bid for message capacity in which to originate a longer message during the remainder of the time period. If the time period is expanded to a ten-minute supercycle, the 100 bit long bidding message can be sent during the first two-minute cycle. (One second subcycles are still employed as discussed relative to FIG. 2.) The winning node is then permitted to submit its longer message during the remainder of the ten-minute supercycle while other nodes refrain, or defer their messages until they make a successful bid.

Examples of information that can be included on such a bidding message are as follows:

(a) A no-bid message to indicate to all other nodes that the particular local node has no messages to be transmitted;

(b) The number of 1,000 bit message blocks needed for the message (or messages) which the particular node desires to transmit;

(c) The priority to be assigned to the message;

(d) The identify of the user of the local node;

(e) Other information to be sent to all other nodes within the 100 bit capacity of the bidding message.

In addition to the information provided in the bidding message, each node has in memory other information which is not transmitted, but which is used to help determine locally the particular node that is the successful bidder for the larger message capacity. By its location in memory (i.e., the time slot location that has been assigned during the one second subcycle), the identity of a node which originates a corresponding bidding message can be determined. Therefore, the identity of a particular node need not be transmitted. If desired, a priority rating for each node can be locally stored in memory for use in resolving conflicts in determining a successful bidder. Each node can thus store the identity of every user of every node to verify a particular bid for the larger message capacity is in fact associated with the node originating the bid message. Further, each node can be assigned a different rank and the rank of each node can be stored locally so that conflicts can be resolved between two nodes sending messages having the same priority.

One example of the use of system 200 of FIG. 3 for determining the successful bidder is as follows:

(a) If there is no bidder for a longer message during a two-minute bidding cycle, there is no successful bidder and no need to follow the bidding cycle with a message cycle. Thus, the two-minute bidding cycle can be repeated immediately.

(b) If there is a single bidder for a message that is longer than the bidding message, that single bidder is then the successful bidder and is assigned the succeeding two-minute cycle of message capacity (50,000 bits). Following the completion of the first two-minute message cycle, if the message has been completed, then the two-minute bidding cycle is repeated. Otherwise, the same successful bidder is assigned an additional two-minute cycle until either the message is completed or the ten-minute supercycle ends.

(c) If there are only two bidders for a longer message, the node assigning the highest priority to the two messages is assigned the required number of 1,000 bit message blocks in the following two-minute message cycle to accommodate the message. If enough 1,000 bit message blocks remain in that two-minute cycle to accommodate the second, lower priority, message, those blocks are assigned to that bidder. Otherwise, the second bidder is assigned the following two-minute message cycle to provide enough additional 1,000 bit blocks to complete that message. If both nodes bidding have assigned the same priority in the bid message, the required number of 1,000 bit message blocks are first assigned to the message from the node having the highest rank and the remaining blocks to the other one. Then, if both messages can be accommodated in the first two-minute message cycle following the bidding cycle, the following two-minute message cycle is used as a bidding cycle. If both user messages cannot be accommodated in the first two-minute message cycle, then the node having the highest priority message and the highest rank is assigned sufficient message blocks during the message cycles and the lower ranking node is assigned sufficient message blocks following the higher ranking nodes message, up to a limit of the eight-minute message portion of each ten-minute supercycle.

(d) If there are more than two nodes bidding for the message, the bids are first ordered according to the priority assigned, and then the message bids within the same priority are ordered on the basis of the rank of the originating node. From among the highest priority messages, that from the highest ranking node is then assigned the requisite number of 1,000 bit message blocks for the transmission of the message. Another message with the same priority from the next highest ranking node is then assigned the requisite number of 1,000 bit message blocks. Then the same procedure is followed until all messages of the same highest priority have been transmitted. Then the same procedure is followed for messages of the next level of priority. The assignment is continued until all messages have been assigned sufficient messages blocks. The assignment is done within two-minute message cycles up to the end of the ten-minute supercycle. At that point, no bids are carried over and those messages not transmitted must wait until making a successful bid for a subsequent ten-minute supercycle where there is message capacity. If there is an incomplete message at the end of a ten-minute supercycle, the remainder of that message is assigned a very high priority for the bidding that begins in the following ten-minute supercycle, or alternatively the remainder of that message is simply not transmitted. In that event, the transmitted portion of the message is identified as being incomplete. Similarly, if the assigned priority is still not sufficiently high to avoid being displaced by other messages, the receiving nodes identify the received portion of the message as being incomplete. The originating node of the incomplete message can retransmit the entire message when it is able to successfully bid for the required transmission capacity. If all messages have been transmitted and there remains two or more two-minute message cycles in that particular ten-minute supercycle, then the next following two-minute message cycle is reassigned as a two-minute bidding cycle for the remaining message cycles in that ten-minute supercycle. If only one two-minute message cycle is left in the supercycle, that remaining two-minute cycle can be used for special test messages to acquire and distribute system maintenance information.

Every node in the network receives the same bidding information from all other nodes in the network. Every node in the network applies the same rules for allocating the transmission capacity. Therefore, all of the nodes simultaneously make the same allocation of the message cycles in the supercycle.

It is seen that the above described message distribution system is completely decentralized and functions successfully without any centralized control. Except for the bid information, all information necessary to make the bid decision is stored locally at each node, and all decisions are simultaneously made locally. Thus, there is no need for transmitting the allocation of the message capacity. Similarly, since the originator of the message is identified by the bid message, that information can be omitted from the message itself. Before the received messages from the survivable message service are delivered to users, the local node adds other information to those messages utilizing information available at the local nodes. This information includes such things as the identity of the originating user, the date and time of the message, and any other useful information that can be stored in the local memory. Because all messages are delivered to all surviving users, there is no need to provide address information. Obviously, should there be some special routing or address information, that information as an exception can be added to the beginning part of the message itself.

Other variations of the embodiment of FIG. 3 are possible. If the internodal transmission capacity assigned to a survivable message capability is increased to 50,000 bits per second, and one second subcycles are used, then it can be seen that 50 of the 1,000 bit message blocks can be assigned during each two-minute cycle. Therefore, if each message in a particular two-minute message cycle can be accommodated in 1,000 bits, 50 different messages from different originators can be accommodated during that period. These messages are also transmitted to every node in the network over every existing and surviving path. During a ten-minute supercycle, 200 of the 1,000 bit message blocks can be accommodated, and could all be made available to the single highest priority message originated by the highest ranking node.

It should be apparent that there are a number of obvious variations that can be made to the basic invention described hereinabove. Examples of some of such variations are described immediately above and others would be obvious to those of ordinary skill in the art.

Figure 4:
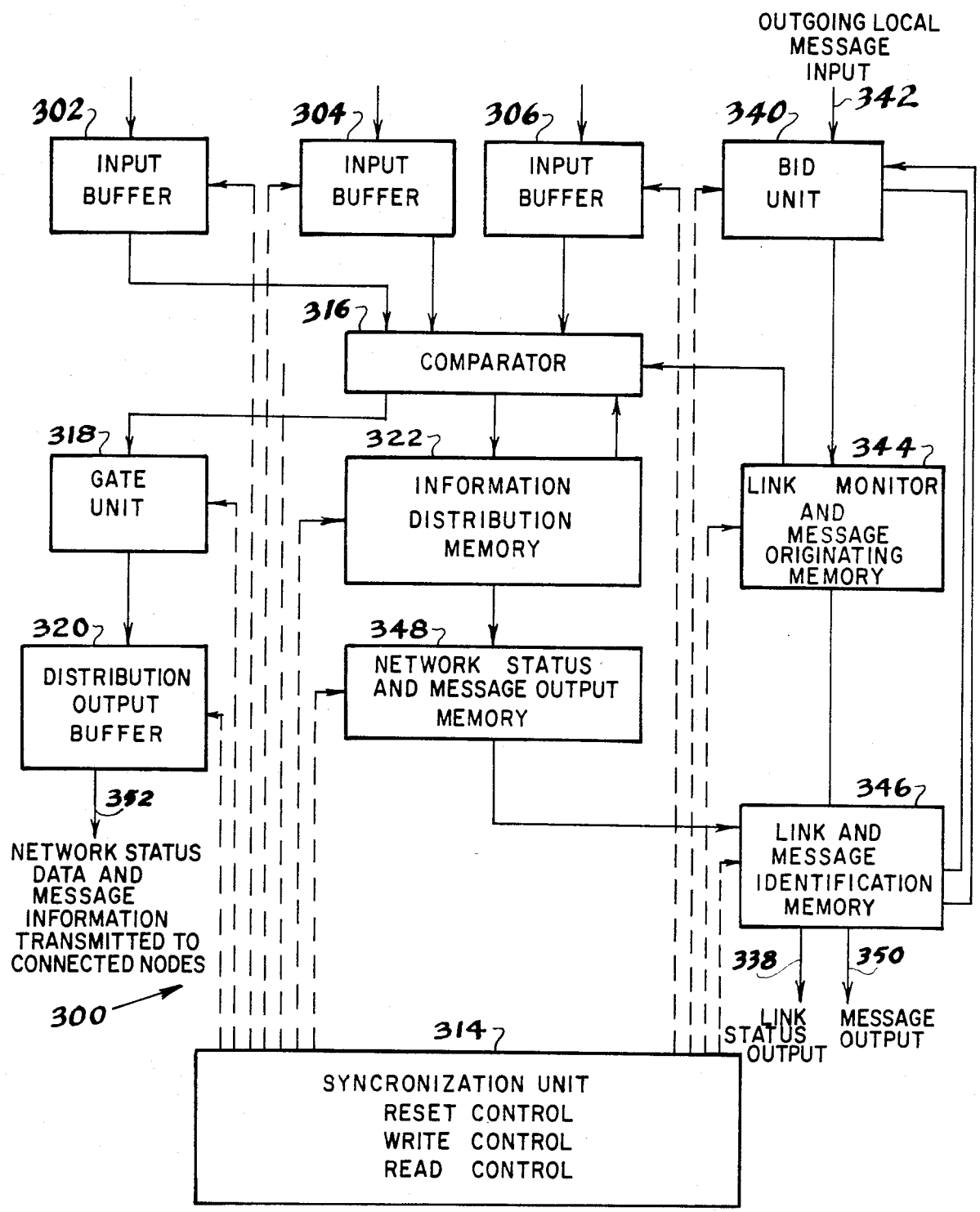
FIG. 4 is a functional schematic block diagram of a further embodiment of the present invention.

With reference now to FIG. 4, a further modification of the present invention is depicted. The system, denoted 300, combines the features of systems 100 depicted in FIG. 2 and system 200 depicted in FIG. 3. For those components of system 300 which are similar to or the same as those components of systems 100 or systems 200, the same last two digits in the numerals for those elements in FIGS. 2 and 3 are used but are in the 300 series of numbers. The configuration, operation and functions of all such components are substantially the same as the corresponding components in FIG. 2 or 3. In addition, information distribution memory 322, although it is substantially the same as memories 122 and 222 in FIGS. 2 and 3, is large enough to accommodate all of the internodal transmissions devoted to both network status and survivable message capability for a full one second subcycle. For example, if 2,000 bits per second are devoted to network status information and 50,000 bits per second are devoted to survivable message traffic, information distribution memory 322 is made large enough to accommodate all 52,000 bits used per one second subcycle.

System 300 further includes a bid unit 340. Bid unit 340 is comprised of conventional electronic circuits for preparing, formatting and processing the bids required for the local node to bid on transmission capacity in the survivable message transmission phase of system 300. Bid unit 340 also evaluates the bids from all other nodes provided by link and message identification memory 346 and determines the successful bidders and the allocation of time slots. The evaluation, determination of successful bidders and allocation of time slots occurs simultaneously at all nodes throughout the network under a specific set of rules so that all nodes produce the same allocation. Examples of the set of rules are discussed above with respect of FIG. 3. Thus, it is not necessary to have any one control node or to use channel capacity to transmit allocations throughout the network.

One output from bid unit 340 is provided to a link monitor and message originating memory 344. Memory 344 stores the status data of all local links for insertion, under command of synchronization unit 314, into the proper time slots. Memory and monitor 344 also handles outgoing messages after they have been processed and formatted by bid unit 340, inserting each bit into the proper time slots under the control of synchronization unit 314 and a link and message identification memory 346.

Link and message identification memory 346 is comprised of conventional components which keeps track of the memory position and time slot location for the link status information and for the memory position and time slot allocation of all survivable message bits.

A network status and message output memory 348 has components similar to network status memory 124 of FIG. 2 and message output buffer 234 of FIG. 3. Because of the larger message size, as discussed above with respect to information distribution memory 322, network status and message output memory 348 has an increased storage capacity to accommodate all 52,000 bits used for the two functions, assuming that status information has been allocated 2,000 bits per second and message traffic has been allocated 50,000 bits per second.

Accordingly, there has been described an invention that provides either a communication information status, a survivable message capability, or a combination of the two. Assuming that a network has a maximum design of 500 nodes with an average of eight internodal communication transmission links per node, and assuming that a maxium transmission capacity of 52,000 bits per second are allocated to an embodiment of the present invention, that embodiment provides the following:

(a) The status of every transmission link in the network which is updated every two minutes;

(b) The ability for every node in the network to transmit a 100 bit bidding message to every other node in the network to bid for message capacity for a longer message, a new bidding message being initiated at least once every ten minutes, and sometimes at two-minute intervals depending on demand for the message capacity;

(c) The ability for a successful bidder to transmit a 200,000 bit message to every other user in the network every ten minutes, assuming such message has a high enough priority and such bidder has a high enough rank according to predetermined designations;

(d) The capability of transmitting up to 200 different messages, each message not exceeding 1,000 bits, by different successful bidders for delivery to every other node in the network at least once during every ten-minute supercycle; and (e) All network status information and survivable messages transmitted over every existing path (up to 119 tandem links), thereby assuring delivery so long as any path to a particular node exists.

Still further modifications of the presently preferred embodiments of the present invention fall within the scope of this invention as set forth in the claims hereinbelow.

I claim:

1. In a communication network that includes at least three nodes and links connecting each node to at least one other node such that each node can communicate with every other node, the improvement comprising a device located at each node for providing and receiving a message to and from each node in the network, said device comprising:
   a synchronization means that is synchronized with the other synchronization units at the other nodes for controlling the operation of other components of said device;
   an input buffer for each link connected to the node for temporarily storing messages transmitted over the link;
   an information distribution memory under control of said synchronization means for storing information; and
   comparing means connected to said input buffers and to said information distribution memory for comparing under control of said synchronization means messages received from said input buffers with selected information stored in said information distribution memory and for storing the result of said comparison in said information distribution memory, said information selections being made based on the time said comparison is made.

2. A device as claimed in claim 1 and further including output means under control of said synchronization means for simultaneously providing in a predetermined timed sequence information from said comparing means to the neighboring nodes in synchronization with output means at all operating neighboring nodes.

3. A device as claimed in claim 2 and further including an identification memory for providing and storing information to and from said distribution memory, said identification memory for storing information that relates the identification of the links to a serial storage location of information about that link in said distribution memory.

4. A device as claimed in claim 2 and further including a storage memory under control of said synchronization means for storing the contents of said distribution memory.

5. A device as claimed in claim 4 and further including an identification memory for providing and storing information to and from said distribution memory and for storing information from said storage memory, said identification memory for storing information that relates the identification of the links to a serial storage location of information about the link in said distribution memory and said storage memory.

6. A device as claimed in claim 5 and further including a link monitor under control of said synchronization means and connected to said identification memory for providing status information at preselected times to said comparing means.

7. A device as claimed in claim 6 wherein said messages and said stored information is divided into a bit stream having a predetermined length, each said bit stream corresponding to and providing the status of each link in said network; and wherein said comparing means compares at predetermined times the bit streams stored in said input buffers, said distribution memory, and said link monitor and provides the results of said comparison to said distribution memory.

8. A device as claimed in claim 7 wherein said bit stream is one bit long and wherein the bit has a true or a false state and represents whether a link is operational when in the true state and inoperational when in the false state; and wherein said comparator provides a true bit signal to said distribution memory whenever any one of the compared inputs is true, and otherwise provides a false input.

9. A device as claimed in claim 2 wherein said output means comprises an output buffer and a gate circuit, both controlled by said synchronization means, said gate circuit for receiving the output from said comparator and for controlling the information transferred to said output buffer, and said output buffer for selectively transferring the information to the other nodes in said network.

10. A device as claimed in claim 2 and further including a message origination memory for receiving a priority message and for providing said message to said comparator at preselected times under control of said synchronization means.

11. A device as claimed in claim 10 and further including a message output buffer for receiving an accumulated message from said distribution memory at the end of an operational cycle.

12. A device as claimed in claim 11 and further including a message identification memory connected to receive the output of said output buffer and for identifying the originating node of the messages and for providing each message from its own node and from other nodes to the users of the local node at predetermined times.

13. A device as claimed in claim 10 and further including a link monitor under control of said synchronization means and connected to said identification memory for providing status information at preselected times to said comparing means.

14. A device as claimed in claim 13 wherein said messages and said stored information is divided into a bit stream having a predetermined length, each said bit stream corresponding to and providing the status of each link in said network; and wherein said comparing means compares at predetermined times the bit streams stored in said input buffers, said distribution memory, and said link monitor and provides the results of said comparison to said distribution memory.

15. A device as claimed in claim 14 wherein said bit stream is one bit long and wherein the bit has a true or a false state and represents whether a link is operational when in the true state and inoperational when in the false state; and wherein said comparator provides a true bit signal to said distribution memory whenever any one of the compared inputs is true, and otherwise provides a false input.

16. A method of providing additional message handling capability to a communication network that includes at least three nodes, each node having a similar communications device, a plurality of local units connected to each node, and links connecting each node to at least one other node such that local units in each node can communicate with local units in every node, the method comprising:
  dividing the operational communication time into a plurality of cycles, dividing each cycle into a plurality of periods, each period for containing information about a predefined node or a predefined local unit;
  synchronously sending and receiving blocks of information from a transmitter over the links to and from neighboring nodes and temporarily storing said received blocks of information in input buffers;
  during each subcycle comparing in a comparator the information stored in said input buffers one block at a time with information contained in a working memory and in a storage memory such that each one of said blocks of stored information from a corresponding predefined node or local unit is compared during a predefined time during said subcycle with each one of said blocks of received information from the same corresponding predefined node or local unit; and
  storing the results of said comparison in said working memory.

17. The method claimed in claim 16 and further comprising initializing the communications device at the beginning of each cycle by transferring information contained in a working memory of said device to a storage memory of said device and resetting said working memory; and
  storing the transferred information by blocks in said storage memory such that each block of information represents information from a predefined node or local unit.

18. The method claimed in claim 17 and further comprising assigning a bit stream to represent the status of each link in the network and assigning each link to a time period within said cycle; and
  transmitting each assigned bit stream by each node at the corresponding time period to every other operational node.

19. The method claimed in claim 17 and further comprising arranging a predetermined number of cycles into a supercycle;
  transmitting from each node during the first cycle of each supercycle a bid message, said bid message containing in coded form the priority of the message and the rank of the transmitter of that message;
  comparing the bid messages from each node by each node and determining the bid that has the highest priority with the highest rank; and
  transmitting the message associated with the winning bid message while inhibiting the transmission of messages not associated with the winning bid message.

20. In a communication network that includes at least three nodes and links connecting each node to at least one other node such that each node can communicate with every other node, the improvement comprising a device located at each node for providing and receiving a message to and from each node in the network, said device comprising:
  a synchronization means that is synchronized with the other synchronization units at the other nodes for controlling the operation of other components of said device;
  an input buffer for each link connected to the node for temporarily storing messages transmitted over the link;
  an information distribution memory under control of said synchronization means for storing information;
  comparing means connected to said input buffers and to said information distribution memory for comparing under control of said synchronization means messages received from said input buffers with selected information stored in said information distribution memory and for storing the result of said comparison in said information distribution memory, said information selections being made based on the time said comparison is made;
  an output means under control of said synchronization means for simultaneously providing in a predetermined timed sequence information from said comparing means to the neighboring nodes in synchronization with output means at all operating neighboring nodes; and
  a storage memory under control of said synchronization means for storing the contents of said distribution memory;
  wherein said synchronization means operates on a predetermined cycle and subcycles within each cycle, and whereby said synchronization means is also for transferring the information stored in said distribution memory to said storage memory at a predetermined subcycle and for thereupon clearing said distribution memory after said transfer.

21. A device as claimed in claim 20 including gate means connected to the output of the comparison means to cause the output of the comparison means to be transmitted to all neighboring nodes during each subcycle except the last subcycle of each cycle, said gate means substituting all zeros during the last subcycle of each cycle.

22. A device as claimed in claim 20 including gate means connected to cause the output of each input buffer to be zeros during the first subcycle of each cycle while providing information received from neighboring nodes during all other subcycles of each cycle.

23. A device as claimed in claim 20 wherein said distribution memory is for building a complete message from information initiated by said other nodes; and
  wherein said storage memory is for providing a longer term storage of the information contained in said distribution memory and is for receiving from said distribution memory said complete message.

24. A device as claimed in claim 20 and further including an identification memory for providing and storing information to and from said distribution memory, said identification memory storing the identification of the node preassigned the ability to initiate each part of the message and relating that identification to each serial storage location in said distribution memory.

* * * * *